US010339069B2

United States Patent
Lee et al.

(10) Patent No.: US 10,339,069 B2
(45) Date of Patent: Jul. 2, 2019

(54) CACHING LARGE OBJECTS IN A COMPUTER SYSTEM WITH MIXED DATA WAREHOUSING AND ONLINE TRANSACTION PROCESSING WORKLOAD

(71) Applicant: Oracle International Corporation, Redwood Shores, CA (US)

(72) Inventors: Adam Y. Lee, San Jose, CA (US); J. William Lee, Belmont, CA (US); Dmitry Mikhailovich Potapov, Redwood City, CA (US); Neil MacNaughton, Los Gatos, CA (US); Vipin Gokhale, San Ramon, CA (US); Bharat Chandra Baddepudi, San Jose, CA (US); David Vengerov, San Jose, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 633 days.

(21) Appl. No.: 13/831,462

(22) Filed: Mar. 14, 2013

(65) Prior Publication Data
US 2014/0095802 A1 Apr. 3, 2014

Related U.S. Application Data

(60) Provisional application No. 61/707,201, filed on Sep. 28, 2012.

(51) Int. Cl.
*G06F 12/12* (2016.01)
*G06F 12/128* (2016.01)
*G06F 12/126* (2016.01)
*G06F 16/2455* (2019.01)

(52) U.S. Cl.
CPC .......... *G06F 12/128* (2013.01); *G06F 12/126* (2013.01); *G06F 16/24561* (2019.01)

(58) Field of Classification Search
None
See application file for complete search history.

(56) References Cited

U.S. PATENT DOCUMENTS

| 7,464,246 | B2* | 12/2008 | Gill et al. | 711/173 |
| 8,688,904 | B1* | 4/2014 | Ari et al. | 711/111 |
| 2010/0235569 | A1* | 9/2010 | Nishimoto et al. | 711/103 |

OTHER PUBLICATIONS

Wang, Wenguang, "Storage Management in RDBMS," Department of Computer Science, University of Saskatchewan, 2001.*

* cited by examiner

*Primary Examiner* — Reginald G Bragdon
*Assistant Examiner* — Edward Wang
(74) *Attorney, Agent, or Firm* — Hickman Palermo Becker Bingham LLP

(57) ABSTRACT

Techniques are provided for managing cached data objects in a mixed workload environment. In an embodiment, a database system receives request to access a target data object. The database system determines whether the request to access the target data object is associated with a first type of workload or a second type of workload. In response to determining that the request is associated with the first type of workload, the target data object replaces a least recently used data object in a cache. In response to determining that the request is associated with the second type of workload, the target data object is cached based on an associated access-level value.

14 Claims, 5 Drawing Sheets

CACHING LARGE OBJECTS IN A COMPUTER SYSTEM WITH MIXED DATA WAREHOUSING AND ONLINE TRANSACTION PROCESSING WORKLOAD

CROSS-REFERENCE TO RELATED APPLICATIONS; BENEFIT CLAIM

This application claims the benefit of Provisional Appln. 61/707,201, filed Sep. 28, 2012, the entire contents of which is hereby incorporated by reference as if fully set forth herein, under 35 U.S.C. § 119(e).

FIELD OF THE INVENTION

The present disclosure relates generally to techniques for caching objects in a computer system and, more specifically, to techniques for prioritizing cache space based on access-level values.

BACKGROUND

A cache algorithm, also referred to as a replacement policy, comprises instructions for managing data objects stored within a memory cache. When the memory cache is full, the cache algorithm selects which data items are evicted from the cache to create space for incoming data items. For example, the Least Recently Used (LRU) cache algorithm tracks when each item of data in the cache was last used. The data item that was least recently used is evicted first from the cache to be replaced by the incoming data.

The LRU algorithm is a simple and effective way of managing cached items. It involves relatively low overhead to implement and maintain. However, the LRU algorithm may perform sub-optimally when it is used for scanning large objects such as in data warehousing workloads where the working set is often larger than the size of the cache. For example, if the object is cached as it is scanned, the latter part of the scan would push out the earlier part of the scan from the cache. Accordingly, a scan can self-thrash, which negates the benefit of caching and also pollutes the cache content by pushing other useful data out of the cache. In another scenario, when multiple processes are scanning different objects for caching, the combined size of the different objects may be larger than the size of the cache, even if each individual object by itself fits into the cache. Thus, the processes scanning concurrently thrash each other's cache content.

One approach to minimize self-thrashing is to exclude caching for large objects and, instead, read the large objects directly from disk without storing the objects in a cache. Although this approach can improve performance by reducing self-thrashing, large objects do not get the benefit of caching, even when there might be available system memory. In addition, when there are multiple concurrent scans of data under the "large object" threshold, there can still be thrashing due to the effective cache size available to each scan.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

Figure 1:
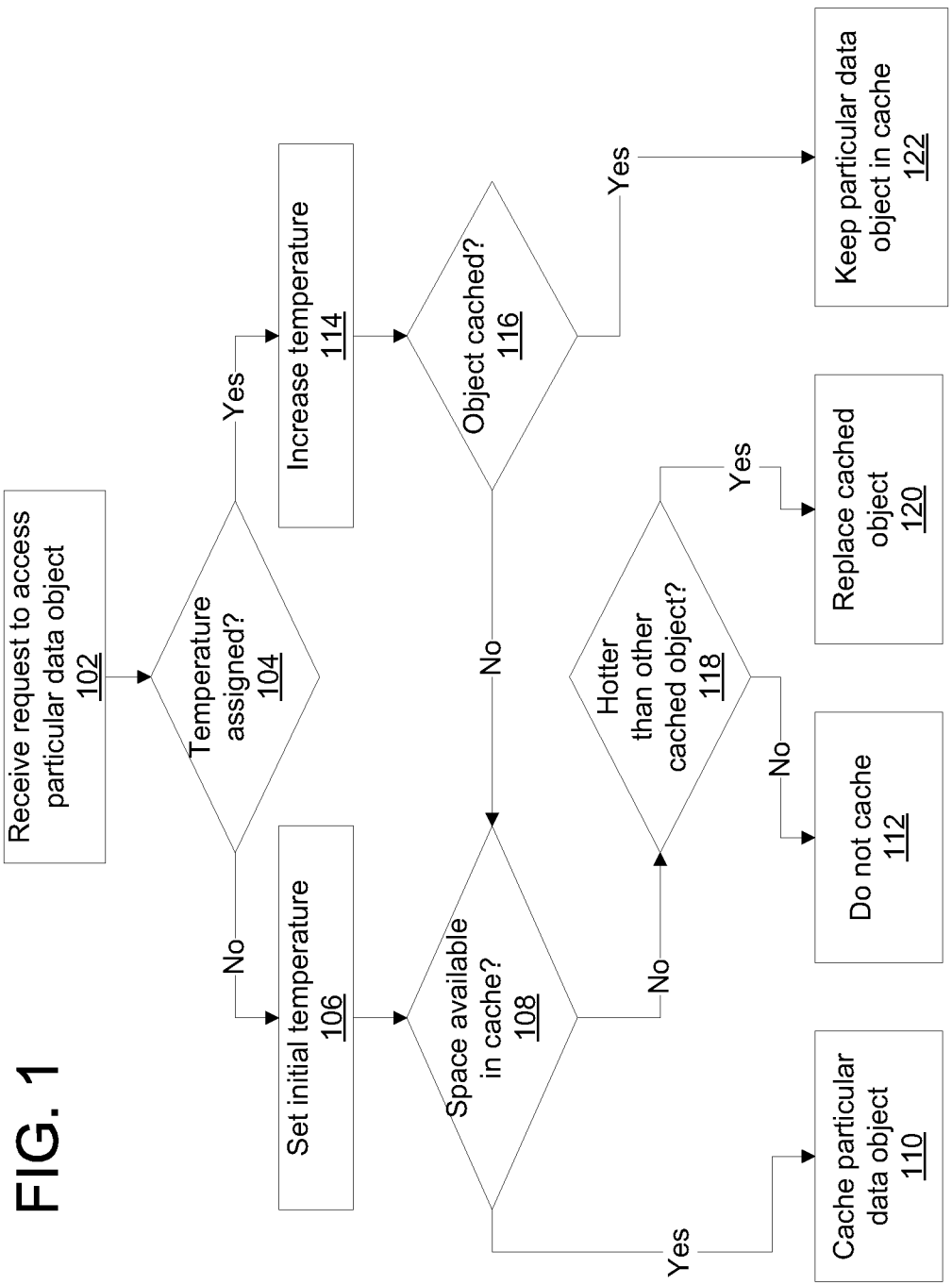
FIG. 1 is a flowchart illustrating a process for managing cached data objects, according to an embodiment.

Techniques are described herein for caching large objects in a computer system with mixed data warehousing ("DW") and online transaction processing ("OLTP") workload. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to techniques described herein, an access-level object-level replacement policy with non-thrashing properties may be used to manage a set of one or more caches. The cache policy may achieve caching benefits for workloads that involve large data scans, such as data warehousing workloads, even if the size of the object is larger than the cache size.

In an embodiment, temperature values are associated with a set of data objects to track the frequency with which the data objects are accessed. The hottest objects are given priority to the cache space. Accordingly, the most recently accessed object may not be cached if it is colder than all other objects in the data cache. In an embodiment, the first time a data object is accessed, it is not cached if the cache is full.

As an object becomes hotter with more accesses, it may replace other objects in the cache. For example, in response to a request to access a target data target object, a temperature value associated with the target data object may be increased. After increasing the temperature value, it is compared with a set of temperature values associated with data objects residing in a cache. Based on the comparison, it is determined whether the target data object is hotter than at least one data object in the cache. In response to determining that the target data object is hotter than at least one data object in the cache, the at least one data object is replaced with the target data object.

In an embodiment, the temperature-based replacement policy co-exists with one or more other replacement policies, such as the LRU replacement policy. The separate replacement policies do not interfere with each other and can be tuned dynamically and automatically. These policies may be used to manage a cache based on the type of workload that is being processed.

In an embodiment, a request is received to access a target data object. A database management system determines whether the request is associated with a first type of workload or a second type of workload. In response to determining that the request is associated with the first type of workload, the least recently used cached data object is replaced with the target data object. In response to determining that the request is associated with the second type of workload, the database management system determines whether to cache the target data object based on a temperature value associated with the target data object.

Database Systems

Embodiments of the present invention are used in the context of DBMSs. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

A database dictionary, also referred to herein as a data dictionary, comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data.

A tablespace is a database storage unit that groups related logical structures together, and contains one or more physical data files. These logical structures may include segments, or an allocation of space for a specific database object such as a table, a table cluster, or an index. A segment may be contained in one data file or may span across multiple data files. A segment may be defined using a set of extents, where an extent contains one or more contiguous database blocks.

A database object such as a tablespace or a segment may be assigned to a particular storage tier. A storage tier denotes a particular balance between access speed and storage cost. Each storage tier may represent a different type or quality of storage medium. In general, as the access speed of a storage medium increases the price to purchase that storage medium tends to increase as well. As a result, many businesses have a limited amount of premium storage space with the fastest access speed and a much larger amount of secondary or tertiary storage space which is slower, but cheaper to purchase in bulk. Thus, in order to maximize the performance of a DBMS, data with higher operational relevance can be placed on faster storage mediums, such as top-quality disk drives, while data with lesser operational relevance can be placed on slower storage mediums, such as optical disks or tape drives.

Each storage tier may also represent a storage area where the data is compressed using a different technique. Similar to the choice of storage medium, each compression technique also represents a tradeoff, in this case between access speed and storage space. More specifically, compression techniques that achieve higher compression ratios also tend to take longer to decompress when accessing the data. Thus, in order to maximize the performance of a database management system, data with higher operational relevance can be stored uncompressed to allow faster access, while data with lower operational relevance can be compressed to save space. Storage tiers may represent a combination of both storage medium and the technique used to compress or store data on the storage medium.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the command itself performs no actions, but rather the DBMS, upon executing the command, performs the corresponding actions. Thus, such statements as used herein, are intended to be shorthand for commands, that when executed by the DBMS, cause the DBMS to perform the corresponding actions.

In most cases, a DBMS executes database commands as one or more transactions, sets of indivisible operations performed on a database. Thus, after executing a given transaction, the database is left in a state where all the transaction's operations have been performed or none of the transaction's operations have been performed. While implementations may differ, most transactions are performed by, 1) beginning the transaction, 2) executing one or more data manipulations or queries, 3) committing the transaction if no errors occurred during execution, and 4) rolling back the transaction if errors occurred during execution. Consequently, a DBMS may maintain logs keeping track of committed and/or uncommitted changes to the database. For example, in some implementations of SQL, executing database commands adds records to REDO and UNDO logs, which can be used to implement rollback, database recovery mechanisms, and features such as flashback queries.

A multi-node database management system is made up of interconnected nodes that share access to the same database. Typically, the nodes are interconnected via a network and share access, in varying degrees, to shared storage, e.g. shared access to a set of disk drives and database blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Replacement Policy Based on Level of Access

In an embodiment, a DBMS manages cached data objects based on their level of access. Each data object that has been accessed within a particular period of time is associated with an access-level value (also referred to herein as a "temperature" or "temperature value") indicating a frequency with which the respective data object has been recently accessed. Each time a data object is accessed, its respective access-level value (i.e., temperature) is increased to indicate a higher frequency of recent accesses. Accordingly, the more frequently a data object is accessed within a given period of time, the hotter the data object becomes, and the hottest objects are cached first.

FIG. 1 is a flowchart illustrating a process for managing cached data objects, according to an embodiment. In step 102, a request to access a target data object is received. In an embodiment, the target data object is a particular database object defined in a data dictionary. Examples include, without limitation, a table, partition, subpartition, or other table fragments. The request may be explicitly included in one or more expressions of a database query. In another embodiment, the request corresponds to a particular database operation on the data object, such as a full or partial table scan. The DBMS may determine such database operations by compiling the database query.

In step 104, the DBMS determines whether a temperature value has already been assigned to the data object. In an embodiment, the DBMS includes a metadata cache that maintains a list of database objects that have positive temperatures. In this step, the DBMS searches the list to determine whether the database object is included. If the object is not included on the list, the object does not have a positive temperature signifying that the object has not been previously accessed or has not been accessed within a threshold period of time. If the object does not have a temperature assigned, then the process continues to step 106. Otherwise, the process continues with step 114.

In step 106, an initial temperature is set for the data object. The values that are assigned may vary from implementation to implementation. In an example embodiment, a positive integer value is assigned at this step. In another embodiment, the temperature value is less than or equal to data objects stored in the cache. This prevents data objects with only a single request from replacing cached objects. In yet another embodiment, this step comprises adding the target data object and the initial temperature to the temperature list. This list may be stored in a metadata cache and/or persistent storage and may be used by the DBMS to identify data objects and their respective temperatures.

If a temperature has already been assigned to the target data object, then in step 114, the DBMS increases the temperature value of the target data object to indicate an increase in the access frequency of the target data object. The manner in which the temperature is increased may vary from implementation to implementation. Examples include, without limitation, incrementing the temperature by a fixed amount or multiplying the current temperature value by a scaling factor. Increasing the temperature may comprise adjusting the temperature value in any other suitable manner to indicate an increase in the frequency of access of the target data object. In an embodiment, this step further comprises updating a temperature list to reflect the new, increased temperature value for the target object. The temperature of the data object is increased at this step even if the data object is not cached.

In step 116, the DBMS determines whether the target data object is already cached. If all or a portion of the target object is not cached, then the process continues to step 108. Otherwise, the process continues to step 122.

In step 108, the DBMS determines if there is space in the cache to store the target data object. If the cache has not been filled, then at least a portion of the target data object may be stored in the cache. Thus, the process continues to step 110, and the target data object is cached.

In an embodiment, if there is space in the cache and the entire data object does not fit in the cache, then the data object may be broken up into different portions. For example, the DBMS may load only a first portion that fits into a buffer cache to prevent self-thrashing. The remaining portion is read from the database into private memory for a particular process, but is not cached. Thus, the portion that fits into the cache is shared with other server processes and may remain in system memory even after the server process that loaded the data terminates. A subsequent access to the target data object may read the first portion from the cache and access the second portion from persistent storage. Each portion may comprise a different set of data blocks from the database object.

If, in step 108, the cache has already been filled, then the process continues to step 118. In step 118, the DBMS determines whether the target data object is hotter than another cached object stored in the cache. The DBMS may search the temperature list to determine which objects are cached and their respective temperatures values. If the target data object is not hotter than another cached object, then the process continues to step 112 and the target object is loaded into private memory, but not cached. If the target data object has the same temperature as a cached data object, the target data object does not replace the cached data object. This prevents thrashing when multiple scans are being performed by different processes in parallel. If the target data object is hotter than another cached object, then the process continues to step 120.

In step 120, the target data object (or uncached portion of the data object) replaces all or a portion of the coolest object in the cache. In an embodiment, the DBMS purges one or more data blocks of the coolest object from the cache to create space for one or more data blocks from the target data object If the target object is already cached at step 116, then in step 122, the target data object is kept in the cache. The target data object may be moved within the cache, as described in further detail below.

Figure 2:
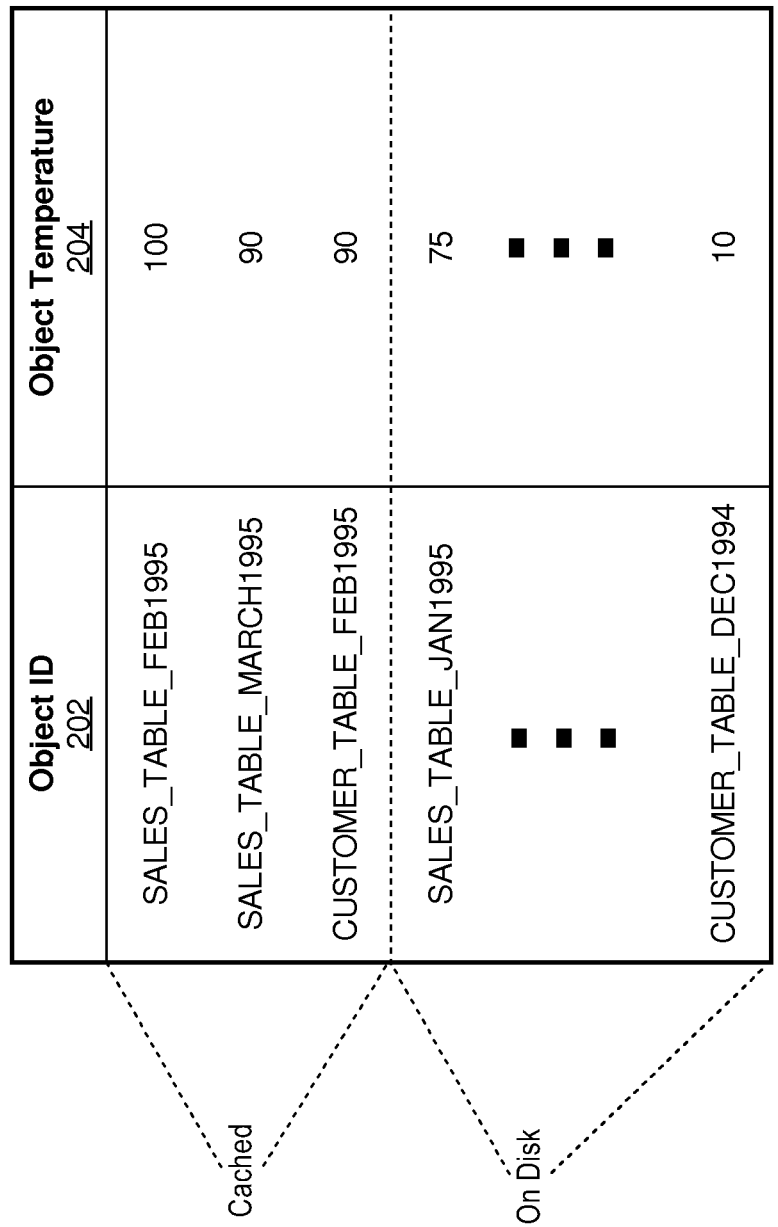
FIG. 2 is a block diagram illustrating example metadata maintained for managing a cache, according to an embodiment.

In an embodiment, the DBMS maintains a sorted list of data objects by temperature in a metadata cache. FIG. 2 is a block diagram of an example sorted list of data objects by temperature, according to an embodiment. The list includes data object identifier 202 and object temperature 204. The object identifier may be the name of the database object, such as a table name, partition name, or subpartition name. Some of the data objects on the sorted temperature list may not be cached. For example, the first three objects illustrated in FIG. 2 may fill up the cache. The remaining objects still reside on disk or other persistent storage in the database. However, these objects have positive temperatures signifying recent accesses. Accordingly, the temperature list tracks the temperature of these data objects in case future accesses to cause the data objects on disk to becomes hotter than a cached object. The temperature list is updated and resorted as the temperatures of data objects change. The temperature list may include other metadata on the data objects, such as the data objects size and the address location of the primary block of the data object.

Managing Multi-Level Caches

In an embodiment, the cache managed according to the access-level replacement policy is a multi-level cache. Typically, the size of the cache increases and the speed decreases as the level of cache increases. Thus, the smallest level cache, such as a level-1 (L1) cache is typically smaller and faster than higher levels of cache, such as level-2 (L2) and level-3 (L3) caches. In an example embodiment, the cache may be implemented using dynamic random-access memory (DRAM) for lower-level caches and flash-based storage devices for the higher-level caches. Other types of memory may also be used, depending on the particular implementation. Examples include without limitation, static RAM (SRAM).

In an embodiment, the DBMS selects the tier of cache in which to store a data objects based on the data object's temperature. The hottest objects are stored in the fastest memory, whereas cooler objects are stored in slower tiers of cache, and the coldest data objects remain on disk. For example in step 122, even if the object is kept in the cache, it may be moved form a higher level cache to a lower level cache. The target object may replace another cooler object in the lower level cache. Thus, the cooler object may be moved from the higher level cache to the lower-level cache or purged from the cache completely to make space for the target object. Accordingly, the hottest objects are maintained in the lower-level, faster access level-1 (L1) cache memory, whereas the cooler data objects are stored in higher-level, slower cache memories, such as L2 or L3 memory, or not cached at all.

In an embodiment, data objects may cross cache boundaries. For example, a first portion of the target object may be stored in L1 cache. If the data object does not completely fit due to size constraints, then the second portion may be stored in the L2 cache. If both these caches do not have space to store the data object, then the remaining portions are stored in higher levels of cache and/or persistent storage.

Increasing Temperature Based on Specific Database Operations

In an embodiment, the access-level value of an object is increased based on the type of database operation that accesses the data object. The types of database operations may vary from implementation to implementation. For example, data warehousing typically involves analyzing large sets of historical data derived from transaction data. Accordingly, data warehousing workloads have frequent scans of large database objects.

In order to accommodate the data warehousing workloads, the temperature may be increased only for scans of large database objects, such as a full table scan operation. In such an embodiment, database operations that access individual data blocks or a small range of data blocks within a large database object would not trigger an increase in the temperature value. Accordingly, the temperature value would represent the frequency of table scans on a particular database table. In other embodiments, partial table scans and/or other operations may also increase the temperature of the accessed database object. Thus, the temperature value may represent the frequency of data accesses for a particular database operation, a set of database operations, or any operation that accesses the database object.

By tracking access only to larger data objects, such as tables, the amount of metadata maintained may be reduced. For example, tracking individual row accesses could result in a very large temperature list, which may actually reduce performance. Therefore, the LRU replacement policy may be better suited than the temperature-based policy for OLTP transactions. In contrast, tracking only accesses to large database objects involves a smaller, more manageable temperature list. Accordingly, the temperature-based policy, described above, is better suited for DW workloads.

Cooling Process

In an embodiment, data objects with positive temperature values are periodically cooled. The cooling process adjusts the access-level value for one or more respective data objects to indicate a reduced activity level (i.e. frequency of recent accesses) for the respective data objects. Thus, objects that are not being accessed regularly may be phased out of the cache to provide more space for new and more recently accessed data.

Figure 3:
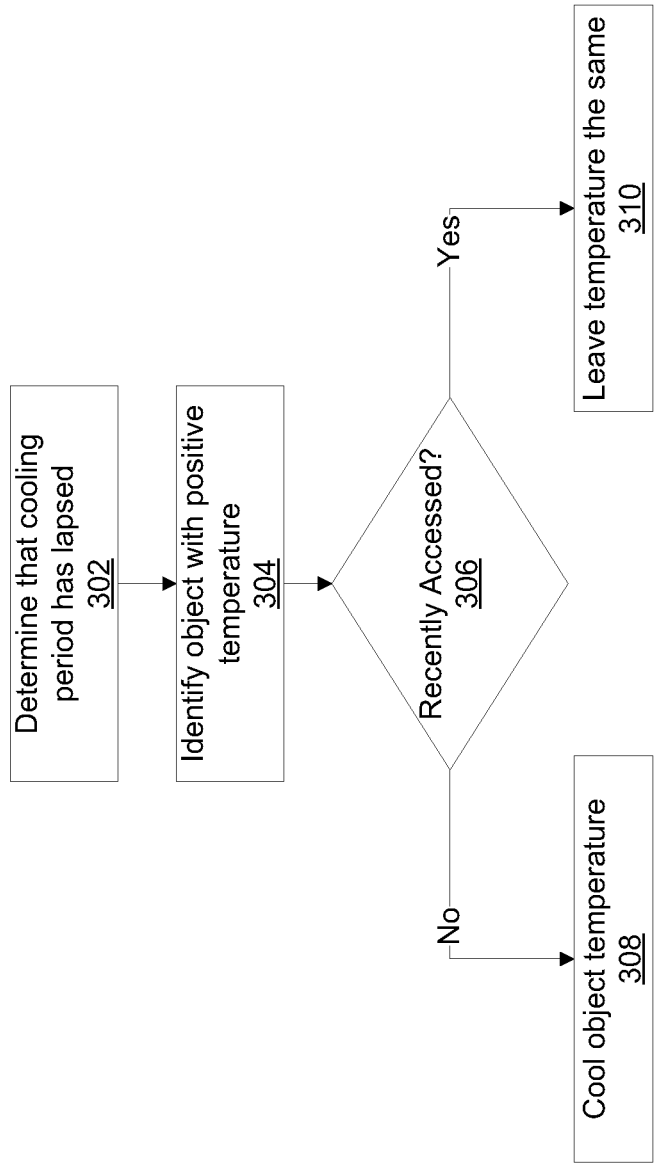
FIG. 3 is a flowchart illustrating an example cooling process, according to an embodiment.

FIG. 3 is a flowchart illustrating example cooling process, according to an embodiment. In step 302, the DBMS determines whether a cooling period has elapsed. This step may be based on logical time or physical time. For example, the DBMS may trigger the cooling process after a certain number of data warehousing scans have been performed. Alternatively, the cooling process may be triggered after a specified period of physical time, such as seconds, minutes, hours, or days, has elapsed. In another embodiment, this cooling period may be based on the amount of data scanned in multiples of cache size. For example, the cooling process may be performed after the DBMS scans twice as much data as the cache size. Once the cooling process is triggered, the cooling period resets, and the DBMS monitors the logical time, physical time and/or amount of data scanned to determine when to trigger the cooling process next.

In step 304, each data object with a positive temperature is identified. The DBMS may iterate through the temperature list during this process.

In step 306, for each data object with a positive temperature value, the DBMS determines whether the data object has been recently accessed. For example, a metadata cache may maintain metadata that indicates whether each item on the temperature list has been accessed within a threshold period of time. The threshold period of time may be equal to the cooling period of step 302 or different, depending on the implementation.

If the object has not been recently accessed, then in step 308 the temperature of the data object is cooled. The manner and amount by which the temperature is cooled may vary from implementation to implementation. For example, the access-level value may be reduced by decrementing the value by a fixed amount or multiplying the value by a cooling factor. If the data object has been recently accessed, then, in step 310, the DBMS may leave the temperature of the data object at the same level.

In an alternative embodiment, all data objects with positive temperatures are cooled, regardless of whether they have been recently accessed. Thus step 306 and 310 are omitted, and every temperature value is decreased after the cooling period of time has elapsed. This reduces the amount of metadata maintained in the metadata cache for each of the objects on the temperature list.

In an embodiment, if the data object has cooled below a threshold value, the data object is purged from the cache. The threshold may vary from implementation to implementation. For example, the threshold may be the initial temperature value. In an alternative embodiment, cached objects are not permitted to cool below a threshold value, such as the initial temperature. Accordingly, if in step 308, the temperature of the data object has already reached the threshold, the DBMS does not cool the target object further. By preventing the temperature form falling below the initial temperature, the cached object will not be replaced by newly accessed objects.

Dynamically Adjusting the Cooling Factor

In an embodiment, the DBMS dynamically adjusts the cooling factor to change the rate at which data objects cool. By cooling objects more quickly, unwanted data may be evicted more quickly from the cache. However, evicting data objects too quickly from the cache may increase the number of reads from persistent storage.

In an embodiment, the DBMS detects trends in data access patterns. The DBMS adjusts the cooling factor when there the trend changes. For example, a database client may be performing an analysis on historical first quarter sales, which includes the months of January, February, and March. The database client may then shift the analysis by a one month window to analyze sales in the months of February, March, and April. The DBMS detects this shift based statistics maintained on the submitted database queries, and increases the cooling factor to evict the January data from the cache more quickly. Once the January data is purged from the cache, the cooling factor may be decreased to a default value.

Figure 4:
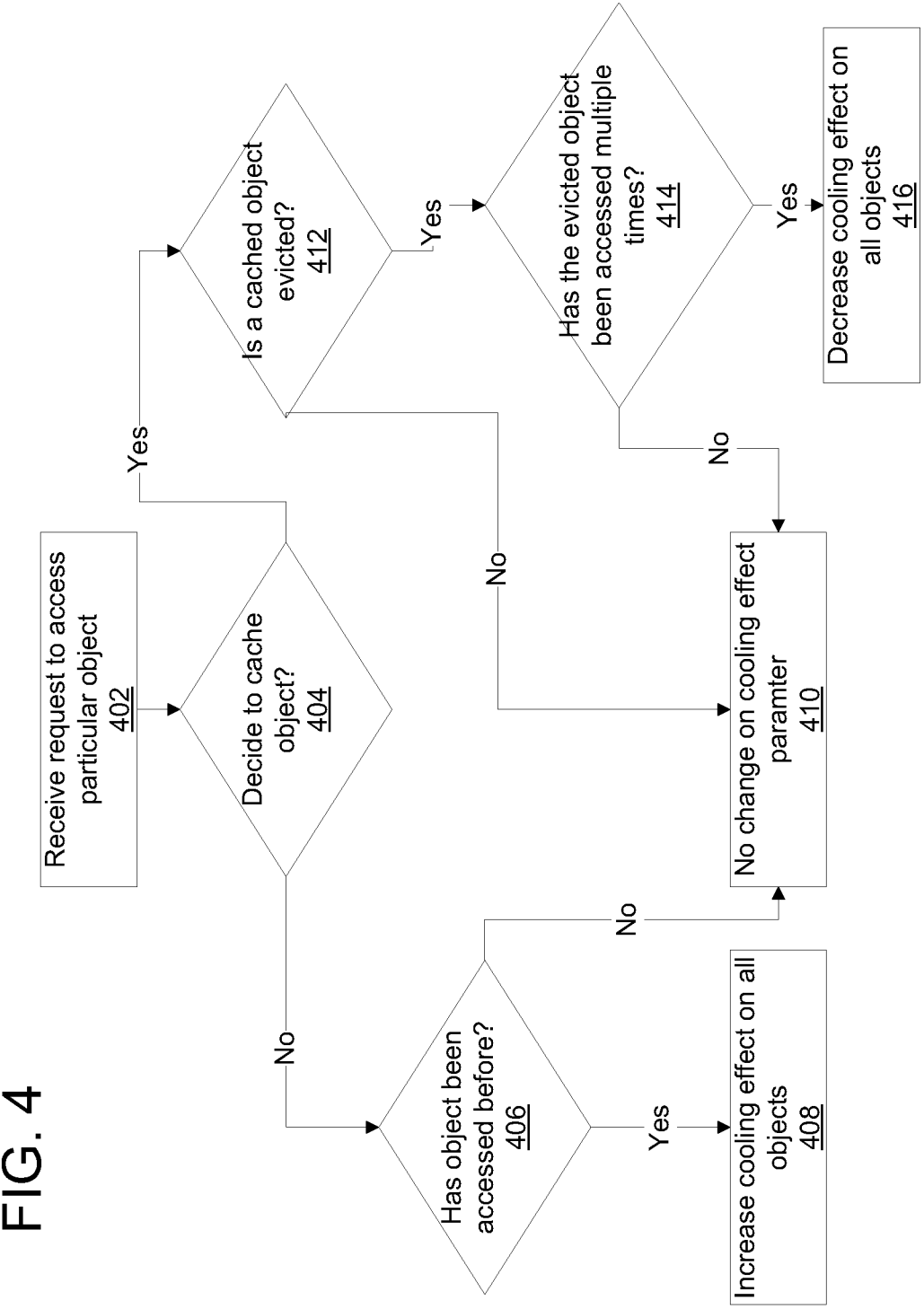
FIG. 4 is a flowchart illustrating an adaptive cooling process, according to an embodiment.

FIG. 4 is a flowchart illustrating an adaptive cooling process, according to an embodiment. In step 402, the DBMS receives a request to access a target object. This step may correspond to step 102 of FIG. 1. In step 404, the DBMS decides whether or not to cache the object based on the access-level replacement policy described above. For example, if the DBMS decides to cache the object at step 110, then the process continues to step 412.

In step 412, the DBMS determines if caching the target object will cause another cache object to be evicted. If no other target object is evicted, then the cache was not full, and the DBMS does not adjust the cooling factor. If the target object does replace a cached object, the process continues to step 414.

In step 414, the DBMS determines whether the evicted data object has been accessed multiple times recently. The DBMS may determine this based on the temperature value of the evicted object. For example, if the evicted object has a temperature value higher than the initial temperature value, the DBMS may determine that the evicted object has been recently accessed multiple times. If the evicted object has been recently accessed multiple times, then the evicted object may be evicted from the cache too soon. Accordingly, the process continues to step 416, and the DBMS decreases the cooling factor to slow down cooling of all objects with positive temperature values. If the evicted object has not been recently accessed multiple times, then the process continues to step 410, and the DBMS does not adjust the cooling effect on the data objects.

If the DBMS decides not to cache the object at step 404, then the process continues to step 406. In step 406, the DBMS determines whether the target object has been previously accessed. For example, the DBMS may search the temperature list to determine whether the target object was previously assigned a temperature. If so, the process continues to step 408, and the cooling factor is increased to speed up cooling of existing all objects with positive temperature values. This increases the speed with which newly popular objects are cached. If the target object has not been previously accessed in step 406, then the process continues to step 410, and there is no adjustment to the cooling factor.

Cache Management in a Mixed Workload Environment

OLTP workloads involve real-time business operations or other transactions, where small amounts of data, such as individual rows and data blocks, are frequently updated. In contrast, data warehousing workloads typically involve online analytical processing (OLAP) of current and/or historical data, where complex queries are directed to large sets of data and changes to the underlying data infrequent. Accordingly, the LRU replacement policy may work more efficiently than the temperature based replacement policy for OLTP workloads, but less efficiently for data warehousing workloads.

In an embodiment, the DBMS implements different cache replacement policies based on the type of workload that the DBMS is processing. The DBMS may implement the LRU replacement policy for OLTP workloads, and the access-based replacement policy, described above, for DW workloads. These replacement policies may coexist and be implemented in the same database instance without interfering with each other. By using different cache algorithms for different workloads, the DBMS can optimize cache usage for different tasks.

In an embodiment, the DBMS determines whether a request to access data is associated with a DW workload or a OLTP workload. The manner in which the DBMS makes this determination may vary from implementation to implementation. For example, the DBMS may make this determination based on whether the request is part of a DW session or an OLTP session or whether the request originated from an OLTP query or a decision support system (DSS) query. If the request is associated with an OLTP workload, then the DBMS implements the LRU replacement policy. If the request is associated with a DW workload, then the DBMS implements the access-based replacement policy.

In an embodiment, the buffers available in buffer cache 124 are divided among different types of workloads. For example, the DBMS may dedicate a certain percentage of buffers to DW tasks and a second percentage of buffers to OLTP tasks. The DBMS manages the DW buffers according to the access-based replacement policy, and the OLTP buffers according to the LRU replacement policy. For example, when performing a DW scan, the DBMS loads data blocks read from database 130 into DW buffers (i.e., those buffers reserved for DW workload). Similarly, when performing an OLTP scan, the DBMS loads data blocks into OLTP buffers.

In an embodiment, OLTP workloads are processes that modify the data accessed and DW workloads are processes that scan and/or otherwise read data without modifying the data accessed. Accordingly, when a query involves a modification to a data object, the DBMS uses the OLTP buffers and the LRU replacement policy. When a query involves a scan of a large data object without modification to the data, the DBMS uses the DW buffers and the access-based replacement policy.

The manner in which the buffers are divided and vary from implementation to implementation. For example, a database administrator (DBA) may allocate a certain percent of buffers for DW scans and the remaining percent for OLTP scans. In another embodiment, the allocation of buffers is automatically determined by the DBMS.

In an embodiment, the buffer allocation is dynamically adjusted to adapt to changing workload conditions. For example, DW sessions may be more frequent in the evenings and OLTP more frequent during the day. Accordingly, the DBMS may allocate more buffers for DW scans in the evening than during the day. In another embodiment, the DBMS may readjust buffer allocation based on detected memory pressure. For example, if the DBMS detects that OLTP sessions are causing frequent scans of the database and DW sessions are not, then the DBMS may take some buffers away from the DW workload and reallocate them for the OLTP workload. The buffers may be reallocated even if they are storing cached data.

In an embodiment, the DBMS stores a list of which buffers are allocated for DW workloads and which buffers are allocated for OLTP workloads. Database manager updates this list as buffers are reallocated between the different workloads. The DBMS determines available buffers for each different replacement policy based on the list. For example, if the DBMS is implementing the access-based replacement policy, then the DBMS checks the DW buffer list for available buffers. If the DBMS is implementing the LRU replacement policy, then the DBMS identifies available buffers from the LRU buffer list.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
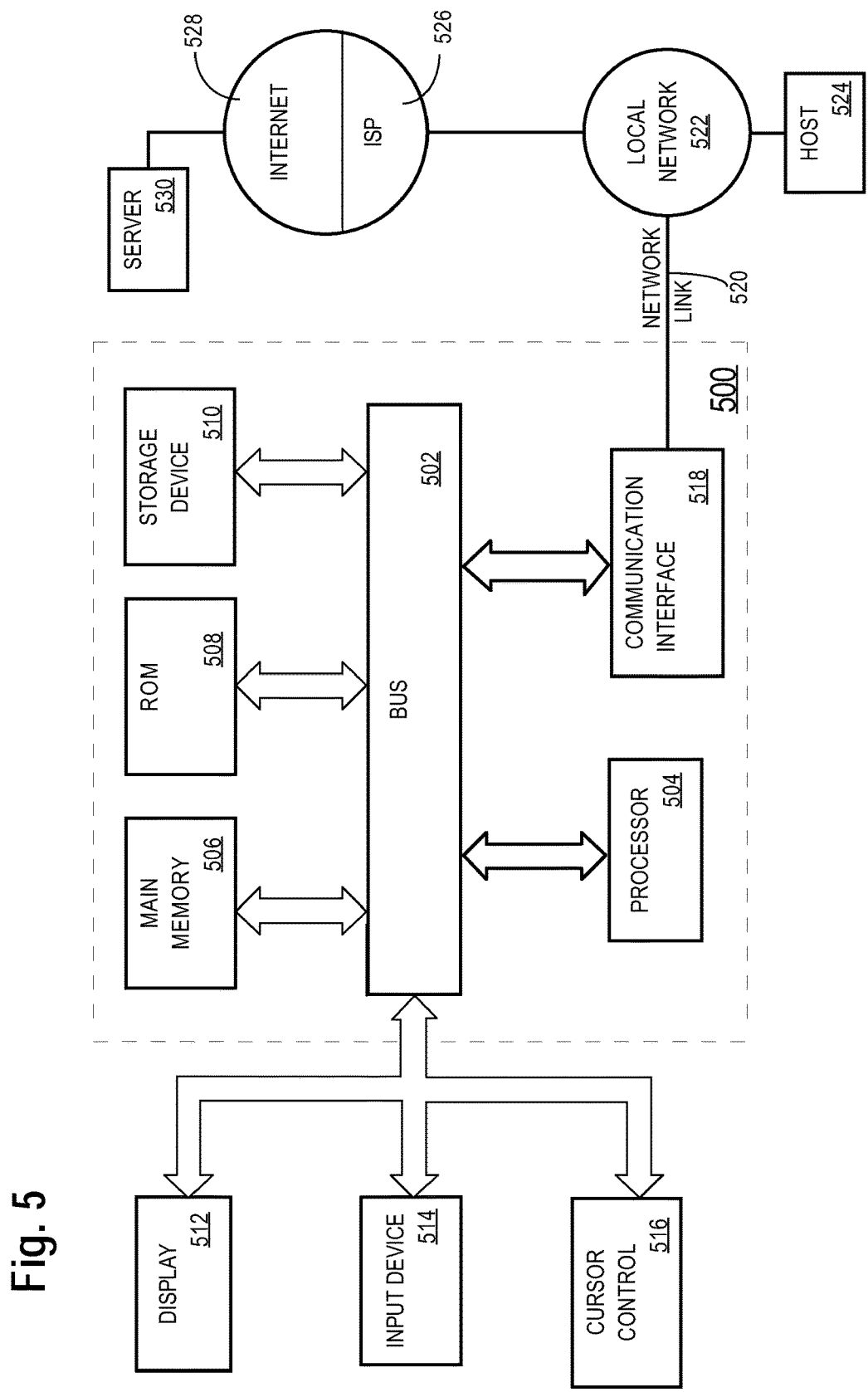
FIG. 5 is a block diagram depicting a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for managing cached data objects, the method comprising:
   receiving a request to access a target data object;
   in response to the request to access the target data object, increasing a first access-level value associated with the target data object;
   after increasing the first access-level value associated with the target data object, comparing the first access-level value associated with the target data object with a set of one or more other access-level values associated with data objects residing in a cache;
   based on said comparing, replacing at least one data object with the target data object;
   adjusting, based on a second access-level value associated with the at least one data object, a rate at which access-level values are adjusted;
   based on the rate at which access-level values are adjusted, adjusting the first access-level value of the target data object; and
   wherein the method is performed by one or more computing devices.

2. The method of claim 1, wherein the target data object is a database table fragment, wherein the request to access the target data object is a full scan of the database table fragment.

3. The method of claim 2, further comprising
   receiving a second request to access a set of one or more data blocks from the database table fragment,
   wherein the set of one or more data blocks are a portion of the database table fragment;
   wherein the first access-level value of the target data object is not increased in response to the second request.

4. The method of claim 1, wherein replacing the at least one data object comprises storing a first portion of the target data object in a first tier of the cache and storing a second portion of the target data object in a second tier of the cache.

5. The method of claim 1, wherein replacing the at least one data object comprising storing only a first portion of the target data object in the cache, wherein a second portion of the data object is not cached.

6. The method of claim 1, wherein the rate at which access-level values are adjusted is based on a particular period of time that triggers changes to the access-level values; wherein the method further comprises determining that the particular period of time has lapsed; wherein determining that the particular period has lapsed comprises at least one of determining that a period of physical time has lapsed, a period of logical time has lapsed, or a particular amount of data has been scanned.

7. The method of claim 1, further wherein replacing said at least one data object with the target data object comprises storing the target data object in a first tier of the cache, the method further comprising:
   receiving a second request to access the target data object while the target data object resides in the first tier of cache;

in response to the second request, increasing the first access-level value of the target data object;

after increasing the first access-level value of the target data object in response to the second request, comparing the first access-level value associated with the target data object with a second set of one or more other access-level values associated with a second set of data objects residing in a second tier of cache;

in response to determining that the first access-level value of the target data object is greater than an access-level value associated with at least one data object of the second set of data objects residing in the cache, replacing said at least one data object of the second set of data objects in the second tier of cache with the target data object.

8. One or more non-transitory computer-readable media storing instructions, which, in response to being executed by one or more processors, cause:

receiving a request to access a target data object;

in response to the request to access the target data object, increasing a first access-level value associated with the target data object;

after increasing the first access-level value associated with the target data object, comparing the first access-level value associated with the target data object with a set of one or more other access-level values associated with data objects residing in a cache;

based on said comparing, replacing at least one data object with the target data object;

adjusting, based on a second access-level value associated with the at least one data object, a rate at which access-level values are adjusted; and based on the rate at which access-level values are adjusted, adjusting the first access-level value of the target data object.

9. The one or more non-transitory computer-readable media of claim 8, wherein the target data object is a database table fragment, wherein the request to access the target data object is a full scan of the database table fragment.

10. The one or more non-transitory computer-readable media of claim 9, wherein the instructions further cause:

receiving a second request to access a set of one or more data blocks from the database table fragment, wherein the set of one or more data blocks are a portion of the database table fragment;

wherein the first access-level value of the target data object is not increased in response to the second request.

11. The one or more non-transitory computer-readable media of claim 8, wherein instructions for replacing the at least one data object comprise instructions for storing a first portion of the target data object in a first tier of the cache and storing a second portion of the target data object in a second tier of the cache.

12. The one or more non-transitory computer-readable media of claim 8, wherein instructions for replacing the at least one data object comprise instructions for storing only a first portion of the target data object in the cache, wherein a second portion of the data object is not cached.

13. The one or more non-transitory computer-readable media of claim 8, wherein the rate at which access-level values are adjusted is based on a particular period of time that triggers changes to the access-level values; wherein the instructions further cause determining that the particular period of time has lapsed; wherein instructions for determining that the particular period has lapsed comprise instructions for at least one of determining that a period of physical time has lapsed, a period of logical time has lapsed, or a particular amount of data has been scanned.

14. The one or more non-transitory computer-readable media of claim 8, wherein instructions for replacing said at least one data object with the target data object comprise instruction for storing the target data object in a first tier of the cache, wherein the instructions further cause:

receiving a second request to access the target data object while the target data object resides in the first tier of the cache;

in response to the second request, increasing the first access-level value of the target data object;

after increasing the first access-level value of the target data object in response to the second request, comparing the first access-level value associated with the target data object with a second set of one or more other access-level values associated with a second set of data objects residing in a second tier of cache;

in response to determining that the first access-level value of the target data object is greater than an access-level value of at least one data object of the second set of data objects residing in the cache, replacing said at least one data object of the second set of data objects in the second tier of cache with the target data object.

* * * * *